(12) United States Patent
Chen

(10) Patent No.: US 11,129,372 B1
(45) Date of Patent: Sep. 28, 2021

(54) DEEP SEA FISHING CAGE

(71) Applicant: Baokui Chen, Qiqihar (CN)

(72) Inventor: Baokui Chen, Qiqihar (CN)

( * ) Notice: Subject to any disclaimer, the term of this patent is extended or adjusted under 35 U.S.C. 154(b) by 0 days.

(21) Appl. No.: 17/223,662

(22) Filed: Apr. 6, 2021

(30) Foreign Application Priority Data

Mar. 1, 2021 (CN) .......................... 202110227175.6

(51) Int. Cl.
*A01K 71/00* (2006.01)
*A01K 75/04* (2006.01)
*A01K 69/02* (2006.01)

(52) U.S. Cl.
CPC .............. *A01K 71/00* (2013.01); *A01K 75/04* (2013.01); *A01K 69/02* (2013.01)

(58) Field of Classification Search
CPC ................................ A01K 71/00; A01K 75/04
See application file for complete search history.

(56) References Cited

U.S. PATENT DOCUMENTS 4,429,659 A * 2/1984 Holyoak ................ A01K 69/08
119/223

* cited by examiner

*Primary Examiner* — Jessica B Wong

(74) *Attorney, Agent, or Firm* — Muncy, Geissler, Olds & Lowe, P.C.

(57) ABSTRACT

The invention discloses a deep sea fishing cage comprising supporting frameworks and cage nets arranged therebetween; said supporting framework comprises a float supporting component and cage frameworks symmetrically arranged on two sides of float supporting component; said cage frameworks are connected with float supporting component via cage nets; the float supporting component comprises a float support rod and a support frame counterweight steel bar; said float support rod is arranged above support frame counterweight steel bar and funnel-shaped escape-proof plate is arranged on lower side of float support rod; said cage framework comprises a supporting component and a cage sealing component, wherein said supporting component is connected with cage sealing component via net surface, said supporting component comprises an upper supporting frame and a lower supporting frame, and two ends of said upper supporting frame are connected with two ends of lower supporting frame respectively to form a semicircular structure.

3 Claims, 4 Drawing Sheets

Section A-A

Section B-B

DEEP SEA FISHING CAGE

BACKGROUND OF THE INVENTION

1. Field of the Invention

The invention relates to the technical field of deep sea fishing device, specifically relating to a deep sea fishing cage.

2. Description of the Related Art

The existing fishing cage is heavy, poor in safety, difficult to operate, incapable of continuous operation and low in efficiency. The problems lead to the overhigh cost of deep sea fishing and frequent casualty accidents.

The technical problems reflected above are therefore problems to be solved urgently by those skilled in the art.

SUMMARY OF THE INVENTION

The invention aims at providing a deep sea fishing cage to solve problems of heavy cage body, poor in safety, difficult to operate, incapable of continuous operation and low in efficiency in prior art.

In order to realize the purpose, the following technical solution is adopted: a deep sea fishing cage comprises supporting frameworks and cage nets arranged between the supporting frameworks;

said supporting framework comprises a float supporting component and cage frameworks symmetrically arranged on two sides of the float supporting component, and said cage frameworks are connected with the float supporting component via cage nets;

the float supporting component comprises a float support rod and a support frame counterweight steel bar; said float support rod is arranged above the support frame counterweight steel bar and a funnel-shaped escape-proof plate is arranged on the lower side of said float support rod; the side surface of said funnel-shaped escape-proof plate is connected with cage nets, and an inlet is formed in the middle of the top surface of the funnel-shaped escape-proof plate;

said cage framework comprises a supporting component and a cage sealing component, wherein said supporting component is connected with the cage sealing component via net surface, said supporting component comprises an upper supporting frame and a lower supporting frame, and two ends of said upper supporting frame are connected with two ends of the lower supporting frame respectively to form a semicircular structure; the opposite side corresponding to the joint of said upper supporting frame and the cage net is provided with a water inlet and outlet hole, a floating cavity is arranged in said upper supporting frame, and the top surface of said upper supporting frame is provided with a cage pulling rope.

As an improvement, the same side of the upper supporting frame and water inlet and outlet hole is symmetrically provided with the first net hole while the same side of the lower supporting frame and water inlet and outlet hole is symmetrically provided with the second net hole, the same side of the lower supporting frame and water inlet and outlet hole is symmetrically provided with the cage sealing hole; said cage sealing component includes cage sealing rope, net rope, cage sealing net and side net, both ends of said net rope respectively passes through the first net hole and the second net hole; the upper part of the cage sealing net is fixedly connected with the upper supporting frame; said side net is provided between the net rope and supporting component, closed ring is formed around the net rope after both ends of the cage sealing rope pass through the cage sealing hole, and said cage sealing rope is fixedly connected with the lower part of the cage sealing net.

As an improvement, a counterweight rod is arranged in said lower supporting frame.

Compared with the prior art, the advantages of the invention lie in: the original deck operation with high strength and high risk is turned into indoor safe operation, the labor intensity is reduced, the working efficiency is improved, and the working risk is reduced.

Figure 1:
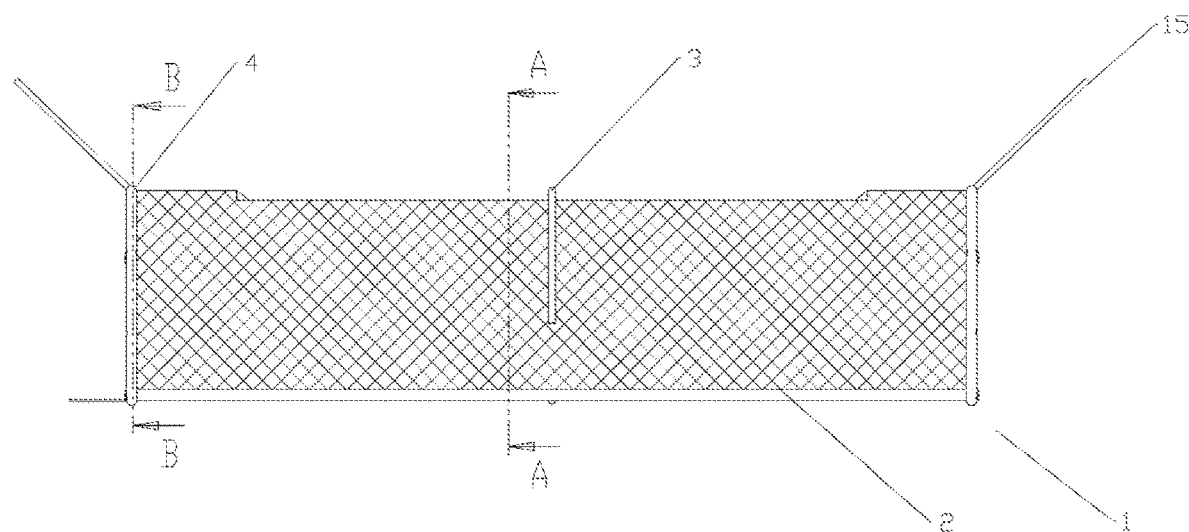
FIG. 1 is the front view of the deep sea fishing cage of the invention.

As is shown in drawings, 1. supporting framework; 2. cage net; 3. float supporting component; 4. cage framework; 5. float support rod; 6. support frame counterweight steel bar; 7. funnel-shaped escape-proof plate; 8. inlet; 9. supporting component; 10. cage sealing component; 11. upper supporting frame; 12. lower supporting frame; 13. water inlet and outlet hole; 14. floating cavity; 15. cage pulling rope; 16. the first net hole; 17. the second net hole; 18. cage sealing hole; 19. cage sealing rope; 20. net rope, 21. cage sealing net; 22. side net, 23. counterweight rod.

DETAILED DESCRIPTION OF THE PREFERRED EMBODIMENTS

Reference will now be made in detail to the embodiments of the invention, embodiments of which are illustrated in the accompanying drawings, wherein like reference numerals refer to the same or similar elements or elements having the same or similar functions. In the description of the invention, it should be understood that the terms "upper", "lower", "front", "rear", "left", "right", "inner", "outer", "vertical", "circumferential", and the like indicate orientations or positional relationships based on orientations or positional relationships shown in the drawings, and are only for convenience of description and simplification of description, but do not indicate or imply that the device or element referred to must have a specific orientation, be constructed and operated in a specific orientation, and thus, should not be construed as limiting the invention.

Figure 2:
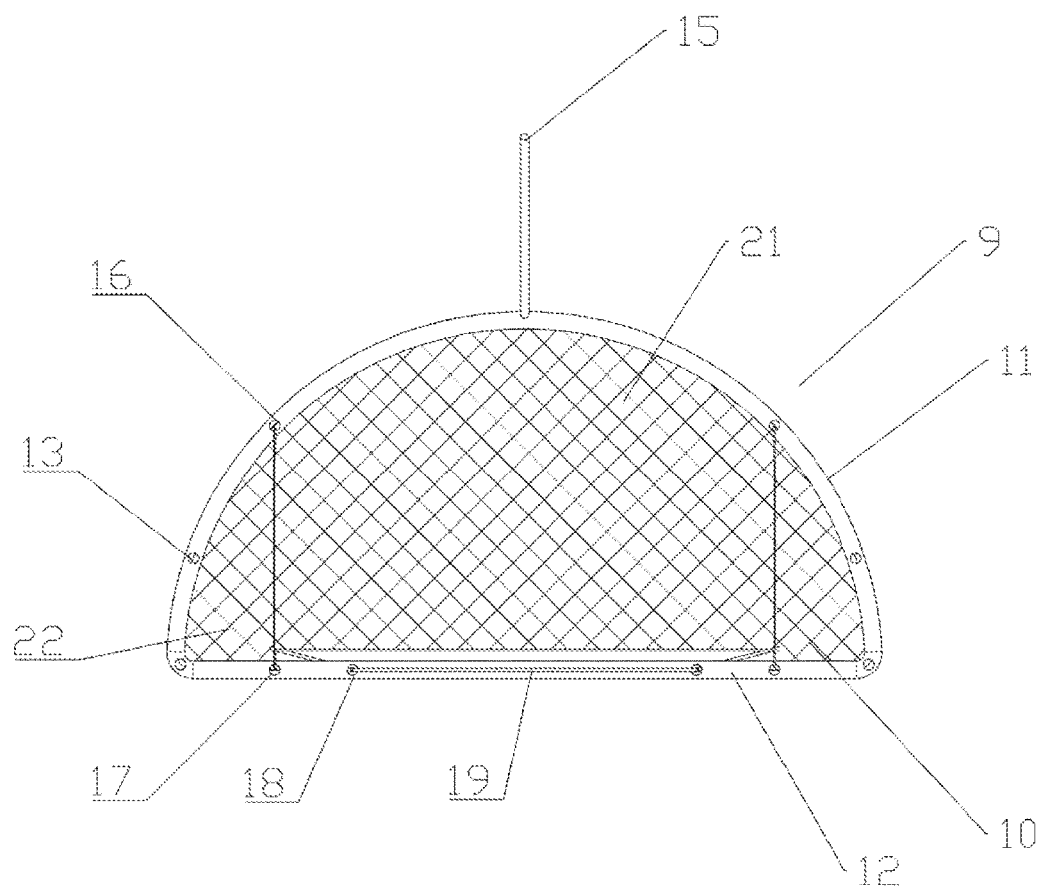
FIG. 2 is the left view of the deep sea fishing cage of the invention.
Figure 3:
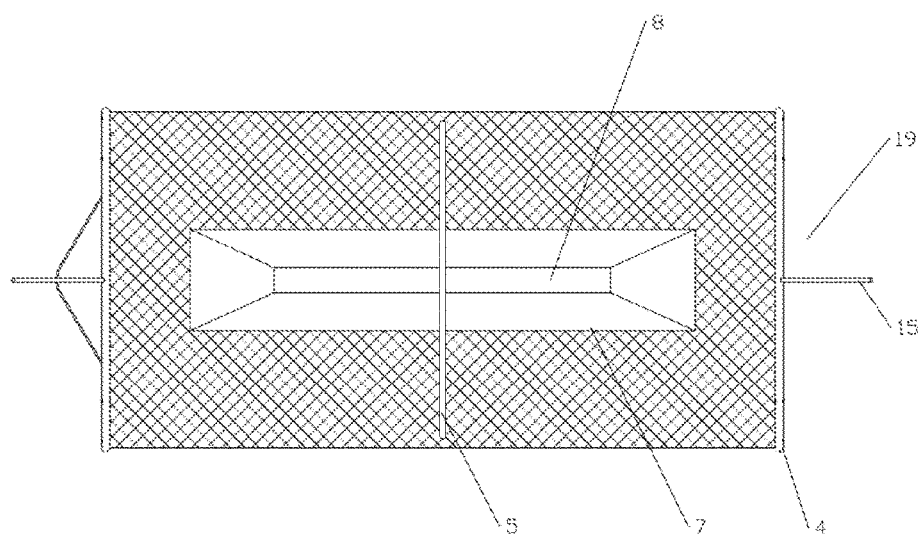
FIG. 3 is the top view of the deep sea fishing cage of the invention.
Figure 4:
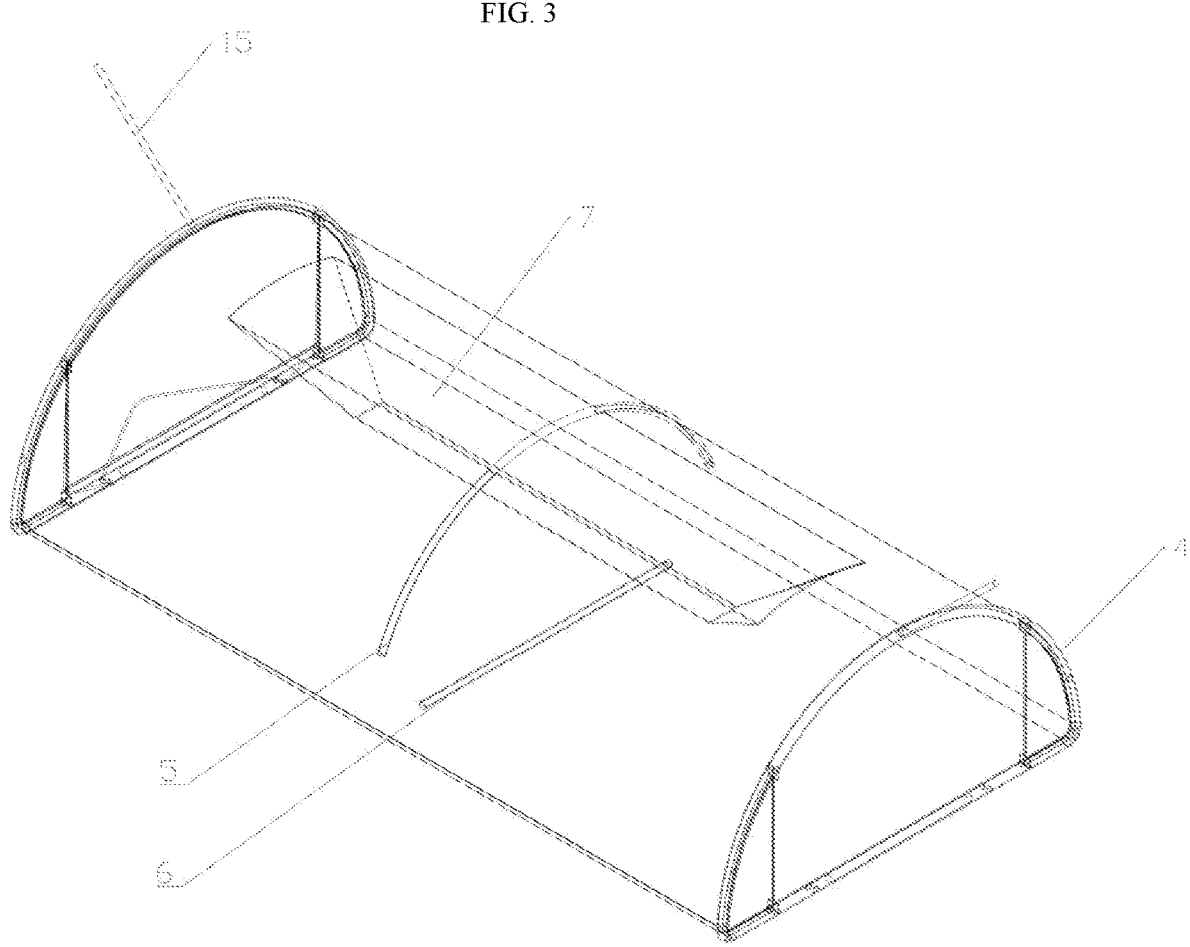
FIG. 4 is the frame structure diagram of the deep sea fishing cage of the invention.
Figure 5:
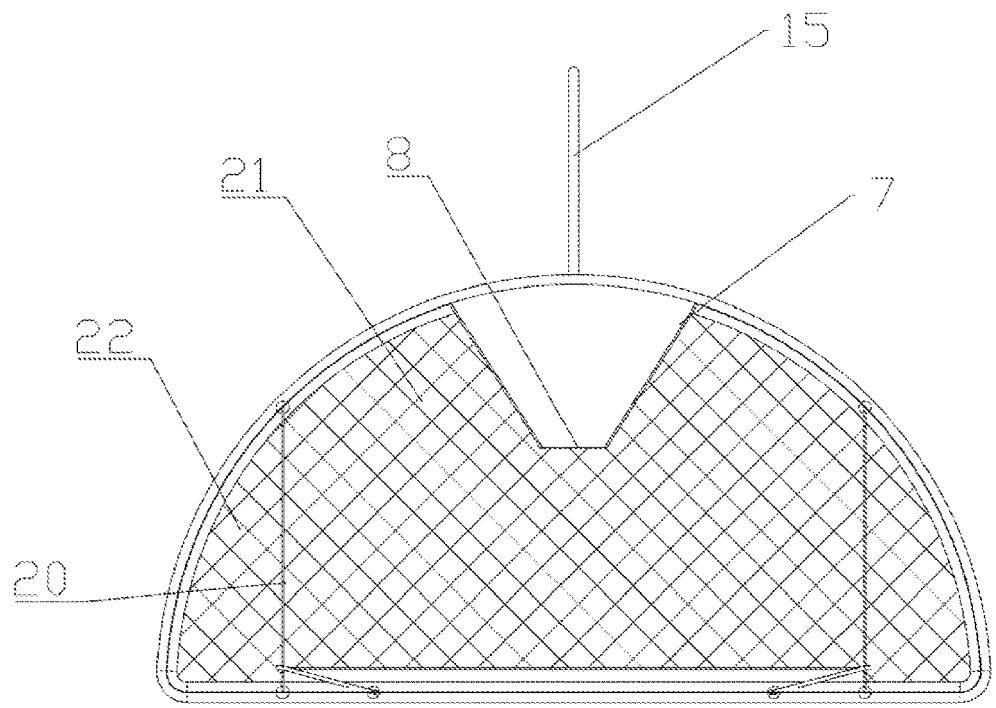
FIG. 5 is the cross-sectional view along the of the deep sea fishing cage of the invention.
Figure 6:
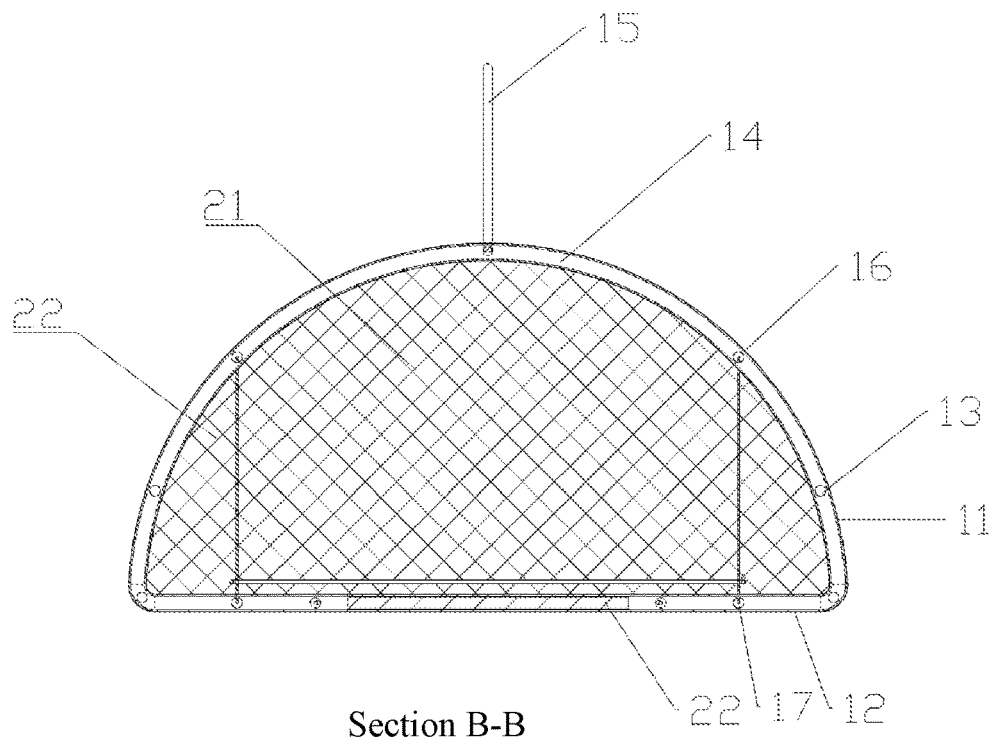
FIG. 6 is the cross-sectional view along the section B-B of the deep sea fishing cage of the invention.
Figure 7:
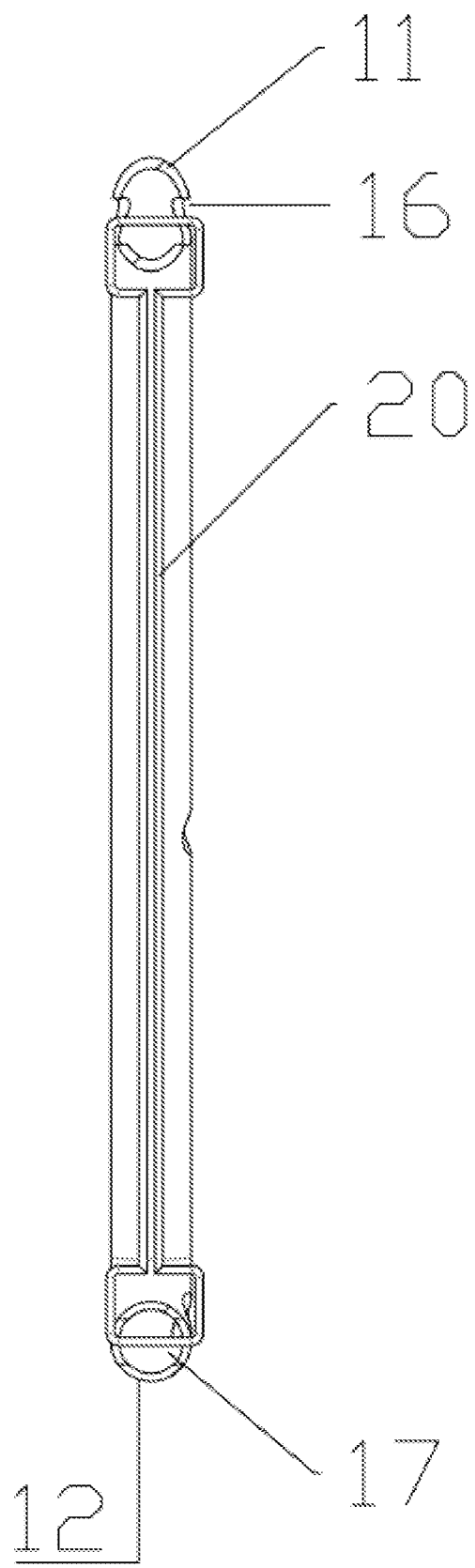
FIG. 7 is the side view of net rope of the deep sea fishing cage of the invention.

With reference to FIG. 1 to FIG. 7, a deep sea fishing cage comprises supporting frameworks 1 and cage nets 2 arranged between the supporting frameworks 1;

said supporting framework 1 comprises a float supporting component 3 and cage frameworks 4 symmetrically arranged on two sides of the float supporting component 3, and said cage frameworks 4 are connected with the float supporting component 3 via cage nets 2;

said float supporting component 3 comprises a float support rod 5 and a support frame counterweight steel bar 6; said float support rod 5 is arranged above the support frame counterweight steel bar 6 and a funnel-shaped escape-proof plate 7 is arranged on the lower side of said float support rod 5; the side surface of said funnel-shaped escape-proof plate 7 is connected with cage nets 2, and an inlet 8 is formed in the middle of the top surface of the funnel-shaped escape-proof plate 7;

said cage framework 4 comprises a supporting component 9 and a cage sealing component 10, wherein said supporting component 9 is connected with the cage sealing component 10 via net surface, said supporting component 9 comprises an upper supporting frame 11 and a lower supporting frame 12, and two ends of said upper supporting frame 11 are connected with two ends of the lower supporting frame 12 respectively to form a semicircular structure; the opposite side corresponding to the joint of said upper supporting frame 11 and the cage net 2 is provided with a water inlet and outlet hole 13, a floating cavity 14 is arranged in said upper supporting frame, and the top surface of said upper supporting frame 11 is provided with a cage pulling rope 15.

As an improvement, the same side of the upper supporting frame 11 and water inlet and outlet hole 13 is symmetrically provided with the first net hole 16 while the same side of the lower supporting frame 11 and water inlet and outlet hole 13 is symmetrically provided with the second net hole 17, the same side of the lower supporting frame 12 and water inlet and outlet hole 13 is symmetrically provided with the cage sealing hole 18; said cage sealing component 10 includes cage sealing rope 19, net rope 20, cage sealing net 21 and side net 22, both ends of said net rope 20 respectively passes through the first net hole 16 and the second net hole 17; the upper part of the cage sealing net 21 is fixedly connected with the upper supporting frame 11; said side net 22 is provided between the net rope 20 and supporting component 9, closed ring is formed around the net rope 20 after both ends of the cage sealing rope 18 pass through the cage sealing hole 18, and said cage sealing rope 19 is fixedly connected with the lower part of the cage sealing net 21.

As an improvement, a counterweight rod 23 is arranged in said lower supporting frame 12.

When specifically implementing the invention, make supporting frameworks 1 with the PPR pipe and having them connected via software, the interior volume of which is big and having buoyancy inherently. The fishing cage is formed by stretching, floating and standing the water inlet and outlet hole 13 and the net rope 20. Partial air can be reserved in the floating cavity 14 of the upper supporting frame 11, the floating cavity and the rest of pipe bodies which are filled with water through the water inlet and outlet hole 13 stand in a three-dimensional mode, the cage pulling rope 15 at two ends are separated towards two sides, so as to make the cage net 2 is stretched into a fishing cage to float and stand. Meanwhile, the support frame counterweight steel bar 6 and the counterweight rods 23 ensure that the overall gravity center of the fishing cage is inclined downwards, to prevent the fishing cage from overturning. The top surface of the fishing cage is provided with a funnel-shaped escape-proof plate 7 and an inlet 8 for catching in deep sea wherein the funnel-shaped escape-proof plate 7 adopts soft plate structure, the inlet 8 can deform and increase when crabs enter, and the crabs will be hindered when they want to escape. When the fishing cage needs to be closed, the cage sealing rope 19 is stretched upwards, which penetrates through the cage sealing hole 18 and slides downwards around the net rope 20 to drive the cage sealing net 21 to roll downwards, thus realizing closing of the fishing cage. The fishing cage can form a string of four cages through equidistant series operation, thereby greatly saving the water outlet time of the cage body, and forming the synchronous cage lifting and descending and automatic cage descending.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A deep sea fishing cage comprises supporting frameworks (1) and cage nets (2) arranged between the supporting frameworks (1);

said supporting framework (1) comprises a float supporting component (3) and cage frameworks (4) symmetrically arranged on two sides of the float supporting component (3), and said cage frameworks (4) are connected with the float supporting component (3) via cage nets (2);

said float supporting component (3) comprises a float support rod (5) and a support frame counterweight steel bar (6); said float support rod (5) is arranged above the support frame counterweight steel bar (6) and a funnel-shaped escape-proof plate (7) is arranged on the lower side of said float support rod (5); the side surface of said funnel-shaped escape-proof plate (7) is connected with cage nets (2), and an inlet (8) is formed in the middle of the top surface of the funnel-shaped escape-proof plate (7);

said cage framework (4) comprises a supporting component (9) and a cage sealing component (10), wherein said supporting component (9) is connected with the cage sealing component (10) via net surface, said supporting component (9) comprises an upper supporting frame (11) and a lower supporting frame (12), and two ends of said upper supporting frame (11) are connected with two ends of the lower supporting frame (12) respectively to form a semicircular structure; the opposite side corresponding to the joint of said upper supporting frame (11) and the cage net (2) is provided with a water inlet and outlet hole (13), a floating cavity (14) is arranged in said upper supporting frame (11), and the top surface of said upper supporting frame (11) is provided with a cage pulling rope (15).

2. The deep sea fishing cage of claim 1 wherein the same side of the upper supporting frame (11) and water inlet and outlet hole (13) is symmetrically provided with a first net hole (16) while the same side of the lower supporting frame (12) and water inlet and outlet hole (13) is symmetrically provided with a second net hole (17), the same side of the lower supporting frame (12) and water inlet and outlet hole (13) is symmetrically provided with a cage sealing hole (18); said cage sealing component (10) includes cage sealing rope (19), net rope (20), cage sealing net (21) and side net (22), both ends of said net rope (20) respectively passes through the first net hole (16) and the second net hole (17); the upper part of the cage sealing net (21) is fixedly connected with the upper supporting frame (11); said side net (22) is provided between the net rope (20) and supporting component (9), closed ring is formed around the net rope (20) after both ends of the cage sealing rope (19) pass through the cage sealing hole (18), and said cage sealing rope (19) is fixedly connected with the lower part of the cage sealing net (21).

3. The deep sea fishing cage of claim 1 wherein a counterweight rod (23) is arranged in said lower supporting frame (12).

\* \* \* \* \*